Figure 1:
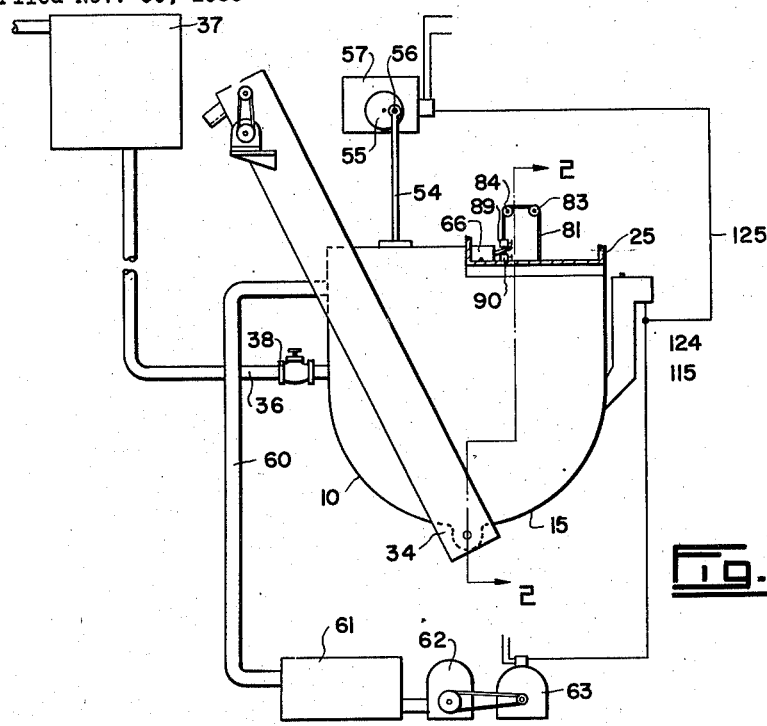

March 25, 1958 G. A. VISSAC 2,828,015
JIG SEPARATOR

Filed Nov. 30, 1953 2 Sheets-Sheet 1

INVENTOR
GUSTAVE A. VISSAC
BY
Fetherstonhaugh & Co.
ATTORNEYS

March 25, 1958  G. A. VISSAC  2,828,015
JIG SEPARATOR

Filed Nov. 30, 1953  2 Sheets-Sheet 2

INVENTOR
GUSTAVE A. VISSAC
BY
Fetherstonhaugh & Co.
ATTORNEYS

United States Patent Office 2,828,015
Patented Mar. 25, 1958

2,828,015

JIG SEPARATOR

Gustave A. Vissac, Vancouver, British Columbia, Canada

Application November 30, 1953, Serial No. 395,048

15 Claims. (Cl. 209—455)

This invention relates to jig separators in which fine materials, such as fine coal or minerals, may be cleaned, concentrated or classified by means of pulsations of a fluid medium, such as water or air.

In jig separators of this nature, the material to be treated is fed on to a bed or screen in a washing chamber, and the separating medium, usually water, is pulsated upwardly through the bed. The bed of material is fluidized during the upstroke or pulsation. The solid particles in suspension in the medium are separated from each other during the downstroke.

When handling fine materials, it is necessary to prevent such materials from passing downwardly through the screen prior to separation, and to prevent packing of the materials. For this reason, it is necessary to provide an artificial bed of coarse material over the screen. It is common practice to form such beds of pieces of feldspar which are usually fairly large and flat, for example, somewhere around two inches by two inches by one inch. The feldspar forms a layer over the screen and the particles thereof act as clap valves which allow water to surge through the screen and bed on the upstroke in order to fluidize the bed. On the downstroke, the fine fluidized material drops freely, each particle according to its own size and specific gravity. This results in the comparatively heavy material (refuse in the case of coal, or mineral in the case of ore) collecting at the bottom of the bed, and the lighter material at the top thereof.

Repetition of this action permits the heavier particles to reach the screen when the clap valves are open, or in other words, when the feldspar pieces or particles are still raised from the screen and in the process of falling down towards the screen. The heavier particles drop through the screen into the hutch therebelow during the downstroke, after which these particles are directed out of the bottom of the hutch into a suitable receptacle or conveyor, such as a de-watering elevator. The light particles build up on top of the bed and are eventually washed out of the apparatus by the water.

An object of the present invention is the provision of a jig separator in which pulsations are created in a fluid, such as water, by air under pressure directed over the water and the periodic discharge of such air therefrom, and including means for automatically controlling the air discharge.

Another object is the provision of a jig separator including means for automatically controlling the degree of suction through the bed thereof.

A further object is the provision of a pulsating jig including means for automatically stopping the pulsations when the thickness or density of the bed therein drops below a predetermined point, and starting the pulsations again when the bed is restored to its proper thickness or density.

A separating jig according to this invention includes pulsating and washing chambers located side by side and connected together at their lower ends, means for continuously supplying water under a constant pressure to the pulsating chamber, an air compartment communicating with the top of the pulsating chamber, means for supplying air under pressure to said compartment, an exhaust compartment also communicating with the top of the pulsating chamber, a control valve for alternately bringing the air and exhaust compartments into communication with the pulsating chamber, an outlet from the exhaust compartment, and a valve controlling said outlet. A screen extends across the washing chamber below the surface of the liquid therein, and a bed of large heavy particles, such as feldspar, is formed on said screen. Suitable means is provided in the washing chamber for controlling the valve in the exhaust compartment outlet in accordance with the thickness or density of the material on top of the screen. An evacuator is provided at the bottom of the washing chamber for removing material which drops down therethrough from the bed. In addition to or in place of the exhaust valve controlling mechanism, suitable means may be provided for shutting off the pulsation-forming equipment when the thickness or density of the bed in the washing chamber drops below a predetermined point, and for starting up said equipment when the thickness or density of the bed returns to normal.

Figures 4, 5:
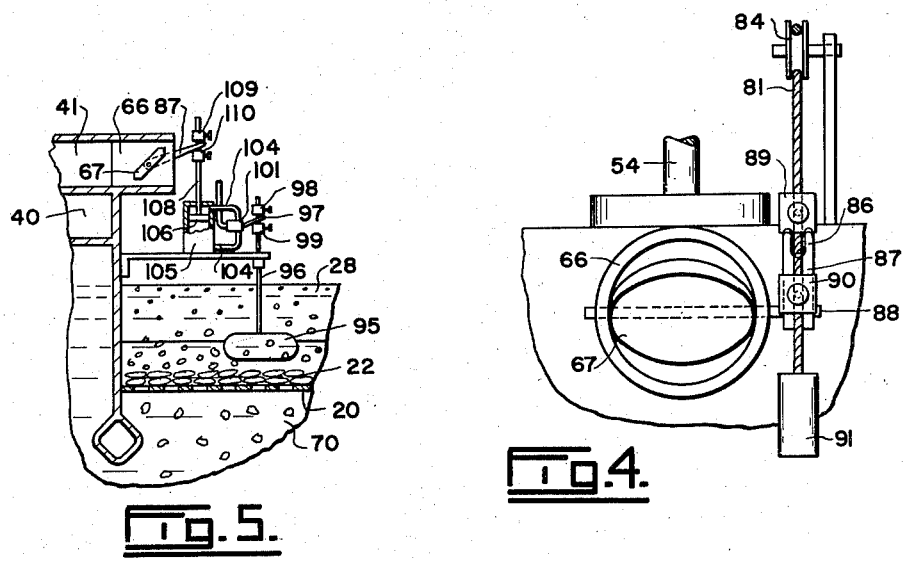
Figure 3:
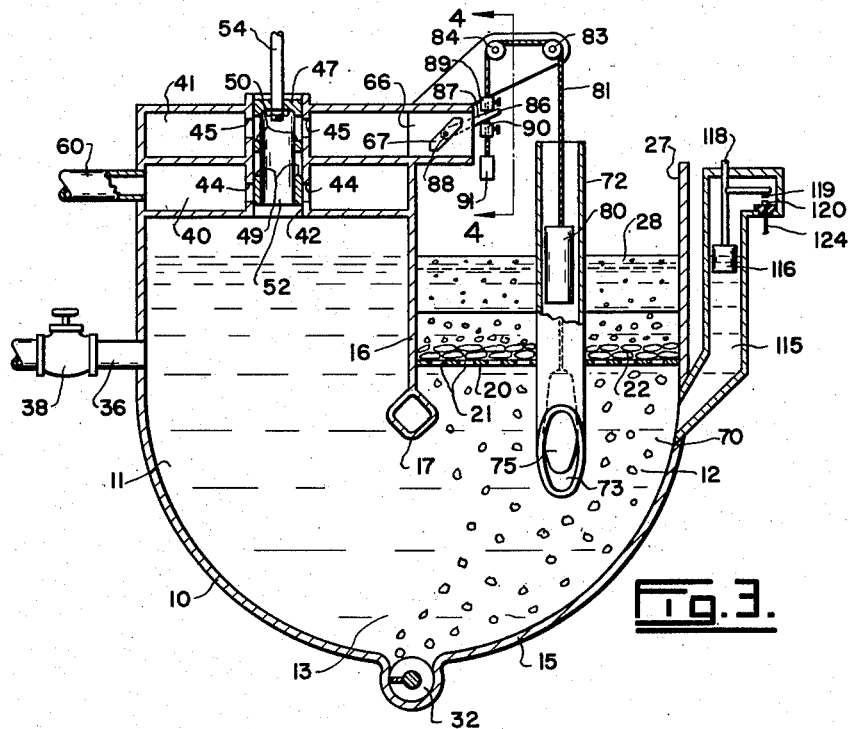
Figure 2:
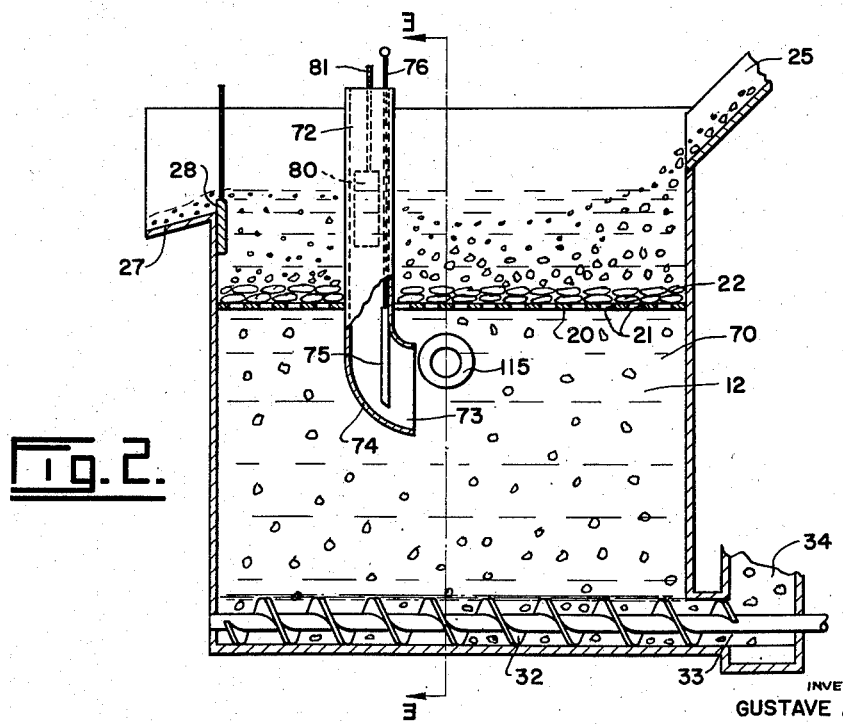

An example of this invention is illustrated in the accompanying drawings, in which, Figure 1 diagrammatically illustrates the jig separator and the mechanism associated therewith, Figure 2 is a vertical section taken substantially on the line 2—2 of Figure 1, showing one form of exhaust controlling mechanism, Figure 3 is a vertical section taken on the line 3—3 of Figure 2, Figure 4 is an enlarged fragmentary section taken on the line 4—4 of Figure 3, and Figure 5 diagrammatically illustrates an alternative form of exhaust controlling mechanism.

Referring to the drawings, 10 is a separating jig having pulsating and washing chambers 11 and 12 located side by side therein and connected together at their lower ends at 13. The bottom 15 of the jig is curved in the usual manner, as clearly shown in Figure 3. The two chambers are separated by a common wall 16 which terminates above the bottom 15 at 17.

A screen 20 extends across the washing chamber 12 at a point spaced above the bottom and below the top thereof. This screen may be formed of ordinary wire material, or it may be in the form of a plate having perforations 21 therein, as shown in the drawings. These perforations are larger than the material to be handled by the jig. An artificial bed 22 formed of coarse, heavy foreign particles remains constantly on the screen 20. These particles are fairly large and flat, and feldspar is usually used for this purpose. In the jig shown in the drawings, the bed 22 has to be changed periodically since it tends to clog up with greasy and fluffy materials during use. However, it is to be understood that suitable means may be provided for constantly changing the bed, but as this does not form part of the present invention, it is not shown or described herein.

A feed chute 25 is provided at the top of the washing chamber 12 above the screen 20 for directing the materials to be cleaned therein. A discharge chute 27 is also provided near the top of the washing chamber. The bottom of this chute is located below the upper edges of the walls of the chamber, as clearly shown in Figure 2. An adjustable weir 28 is provided at the discharge chute. This weir may be adjusted up and down to regulate the height of the water in the washing chamber.

Refuse is removed from the bottom of the chamber 12 in any desired manner. In this example, a screw conveyor 32 is located at the bottom of the chamber and directs material laterally therefrom through an outlet 33 into a de-watering elevator 34, which elevates the refuse and discharges it at any desired point.

Water is continuously supplied to the pulsating chamber 11 through a pipe 36. The flow and pressure of this water must be kept constant, and this may be regulated in any suitable way, such as by means of a constant head tank 37, from which the pipe 36 extends and a valve 38 in the latter, see Figure 1.

Air is alternatively supplied to and exhausted from the top of the chamber 11. Air and exhaust compartments 40 and 41 are positioned at the top of the pulsating chamber, one on top of the other, around a common passage 42. The air compartment has ports 44 communicating with the air passage, while the exhaust compartment has ports 45 communicating with said passage. A hollow valve 47 is slidably mounted in the passage 42 and has ports 49 and 50 adapted to be alternately brought into communicating with the ports 44 and 45, respectively. The lower end of the valve 47 is open, as at 52, and communicates with the interior of the pulsating chamber.

The valve 47 is reciprocated in the passage 42 in any convenient manner in order to bring its ports 49 and 50 alternately into communication with the air compartment ports 44 and exhaust compartment ports 45. In this example, a connecting link 54 extends upwardly from the valve to a disc 55, to which it is connected at 56 at a point spaced from the centre of rotation thereof. This disc is rotated by an electric motor 57.

Air is continuously supplied to the air compartment 40 in any desired manner, and in this case, a pipe 60 is connected to said compartment. This pipe extends from an air tank 61 which is supplied with air by a compressor 62 driven by an electric motor 63. The air pressure will depend upon the construction of the jig, the size thereof, and the material being cleansed or classified. For cleaning coal, it has been found that a maximum of three pounds of pressure is usually sufficient.

The exhaust compartment 41 has an outlet pipe 66 controlled by a valve of any convenient type. In this example, a butterfly valve 67 is located in this pipe. This valve, and the means of controlling it is one of the main features of the present invention. This valve is controlled by the condition of the bed in the screen 22, and Figures 1 to 5 show one way of doing this, including a float arrangement located in the washing chamber 12. In this example, the valve is controlled in accordance with the conditions beneath the screen 20 in the area 70, commonly known as the hutch, and the float arrangement must be in communication with the latter.

A tube 72 extends downwardly from a point near the top of the washing chamber through the screen 20 and has an entrance 73 at its lower end within the hutch 70. It is preferable to bend the tube at 74 so that the entrance faces laterally therefrom instead of downwardly in the hutch. The size of the entrance is regulated by means of a sliding gate 75 which is controlled from above the tube 72 in any convenient manner, such as by means of a rod 76. As the lower end of the tube opens into the washing chamber, the water in the latter will flow into the tube to substantially the same level as it is in both the pulsating and washing chambers.

A float 80 rides in the water within the tube 72, and is connected to the valve 67 in any desired manner. One way of doing this is by means of a cable 81 extending upwardly from the float and out of the tube over pulleys 83 and 84. The cable extends downwardly from the last pulley through the forked end 86 of an arm 87 connected at its opposite end to a shaft 88 extending into the outlet tube 66 and upon which the valve 67 is fixedly mounted for rotation within said tube. Stops 89 and 90 are adjustably connected to the cable above and below the link 87, and a weight 91 is fixedly connected to the outer end of said cable.

The operation of the apparatus described so far is as follows:

As previously stated, water is supplied through the pipe 36 to the pulsating chamber 11 at a constant rate for the air pressure used under a given set of conditions in the apparatus. When the valve 47 is moved to its lowermost position, air travels through the ports 44 and 49 into the pulsating chamber, and when the valve is moved to its uppermost position, air is exhausted from the chamber through the ports 50 and 45 into the exhaust compartment 41. This air leaves the compartment through the outlet tube 66, and the valve 67 is normally maintained about half open. The rate of discharge of the air will depend upon the setting of the valve. If the valve is closed, there will be no discharge, and the rate of discharge will increase as the valve is moved to its fully-open position.

When the air enters the pulsating chamber from the air compartment, the water in the chamber is forced downwardly therein and is forced upwardly in the washing chamber through the screen 20 and the bed material 22 thereon. When the valve 47 moves to its opposite position, the air is exhausted from the top of the pulsating chamber through the exhaust compartment. This permits the water to rise in the pulsating chamber, creating a downward suction through the bed 22 in the washing chamber. Thus, water is alternately forced upwardly and sucked downwardly through the bed.

Assuming the material being cleaned is fine coal, the coal and foreign particles mixed therewith are directed into the top of the washing chamber through the chute 25. This material drops downwardly through the water in the chamber towards the bed 22. During the downward movement of the water in the washing chamber, the particles of material are separated according to size and specific gravity, the heavier particles dropping downwardly faster than the lighter and forming a lower layer on top of or within the bed 22, while the lighter particles gather on top. Each time the water moves upwardly, the large pieces forming the bed 22 are lifted upwardly and separated from each other, and when the downward suction starts, the heavier particles of the material being cleaned are drawn or sucked downwardly through the bed and the screen 20 so that they are free to drop to the bottom of the hutch 70, after which they are removed by the conveyor 32 and the elevator 34. The finer or lighter particles are eventually washed upwardly and over the weir 28 and out of the device through the chute 27.

If the bed on the screen 20 begins to clog up or get too thick by reason of an over-accumulation of the heavier materials, it is desirable to increase the suction below the screen in order to draw more of this heavy material therethrough. On the other hand, if the bed becomes too thin, either as a result of a reduction of heavy materials being supplied to the washing compartment or the loss of pieces forming the bed 22, it is necessary to reduce the suction downwardly through the bed in order to prevent the clean or light materials from being drawn therethrough.

As the thickness or density of the bed on the screen builds up, it offers more resistance to the water on the upstroke so that the pressure below said screen increases during the upsurge of the water. This means that the level of the water within the tube 72 rises, raising the float 80 accordingly. The stop 89 is set so that when the water in the tube rises to a predetermined point, it starts to open the valve 67. This action permits a greater discharge of air from the pulsating chamber during the upward movement of the water therein so that the degree of suction through the bed and screen is increased to draw more of the heavy material or refuse through the screen. If the thickness or density of the bed is reduced by this action, the pressure of the water in the hutch will drop so that the float 80 will move to a lower position. On the other hand, if the density does not decrease, owing to a too rapid supply of the materials through the chute 25, the valve 67 will be moved to its fully open position, which should be sufficient to thin out the bed under ordinary conditions.

If the supply of materials to the bed decreases, the thickness or density of the latter is reduced, resulting in the pressure in the hutch 70 dropping. This causes the water in the tube 72 and, consequently, the float 80 to move downwardly. The stop 90 on the cable 81 is adjusted to the point that when the thickness or density reaches a predetermined low, the valve 67 is moved towards the closed position. This action will continue until the valve is completely closed, at which time there is very little or no air exhausted from the pulsating chamber so that there is little or no downward suction through the bed on the screen. This prevents the fine material from being drawn downwardly through the bed, and it reaches the possibility of the refuse being washed upwardly and over the weir along with the coal.

The stops 89 and 90 may be set at any desired points on the cable 81.

Figure 5 diagrammatically illustrates an alternative float arrangement for controlling valve 67 in accordance with the condition of the bed on screen 20. A float 95 is positioned in the material lying on or suspended above the bed 22 on the screen 20. A stem 96 extends upwardly from the float and is connected to an arm 97 by adjustable stops 98 and 99. This arm controls a valve 101 which is adapted to direct a fluid, such as air or oil, through either of pipes 103 and 104 to the top or bottom of a cylinder 105 in which a piston 106 is slidably mounted. A stem 108 extends upwardly from the piston and is connected to the arm 87 by means of adjustable stops 109 and 110.

With the arrangement of Figure 5, when the density of the material forming the bed on plate 22 increases (thereby decreasing the suction downwardly therethrough), float 95 rises to operate valve 101 and cause fluid to be directed to the top of cylinder 105. As the piston 106 drops, it opens valve 67 further, thus increasing the degree of suction through the bed. On the other hand, a decrease in bed density allows the float to drop, operating valve 101 in the opposite direction to cause fluid to be directed to the bottom of cylinder 105. As the piston moves upwardly, it moves valve 67 towards the closed position, thereby decreasing the amount of suction through the bed.

An additional control may be added in order to stop the pulsations altogether just in case the thickness and density of the bed on the screen drops below a critical point. A suitable float or electrode and float arrangement may be provided for this purpose. For example, a suitable float arrangement of any desired type may be provided for shutting off the air supply and/or stopping the reciprocation of the air valve 47. One way of doing this is to provide a tube 115 communicating with the hutch 70 immediately below the screen 20. This tube has a float 116 therein. As the pressure below the screen in the hutch drops, the level of the water in the tube and the float 116 will drop accordingly. When the float reaches a predetermined point, it shuts off either or both of the motors 57 and 63. One way of doing this is diagrammatically illustrated in Figures 1 and 3. A stem 118 extends upwardly from the float 116, and carries a contact 119 which is normally spaced from another contact 120 supported in an enlargement 122 at the upper end of the tube 115. Wires 124 and 125 extend from the last-mentioned contact to switches controlling the motors 63 and 57, respectively. When the contacts 119 and 120 come together, the switches are operated to stop the motors, and when the contacts separate, the motors are set into operation again. Thus, it will be seen that when the float 116 drops below a predetermined point, the contacts 119 and 120 will close to shut off the motors which supply air to the air compartment 40 and reciprocate the valve 47.

The float control 116 prevents fine materials being sucked downwardly through the bed and/or refuse being washed out of the chamber with the coal when the thickness and density of the bed on the screen drops to a critical point. It is obvious that this float control may be used in the jig without the exhaust control described above.

From the above, it will be seen that the suction through the bed is controlled instead of the pressure used to produce the pulsations. This means that the suction may be regulated without increasing the force of the upward stroke which would result in unnecessary disturbance of the bed and, possibly, the washing of refuse out of the jig with the coal or other material being cleaned.

What I claim as my invention is:

1. In a jig for separating materials of different sizes or specific gravity, comprising pulsating and washing chambers located side by side and communicating at the bottoms thereof, a coarse screen across the washing chamber spaced below the top thereof, an artificial bed of comparatively large heavy pieces of foreign material on the screen, means continuously supplying a fluid to the pulsating chamber, means alternately supplying air to and exhausting air from the top of the pulsating chamber to cause the fluid to pulsate up and down through the bed in the washing chamber, the upward movement of the fluid loosening the bed and separating the materials and the first part of the downward movement of said fluid sucking the heavier material through the bed and through the screen and means controlling the exhausting of the air from the pulsating chamber in accordance with the density or thickness of the bed in the washing chamber.

2. A jig separator as claimed in claim 1 in which the exhaust controlling means increases and decreases the amount of exhaust as the bed density or thickness respectively increases and decreases.

3. A jig separator as claimed in claim 1 including means at the washing chamber for shutting off the air supply when the pressure of the fluid beneath the bed drops below a predetermined point.

4. In a jig for separating materials of different sizes or specific gravity, comprising pulsating and washing chambers located side by side and communicating at the bottoms thereof, a coarse screen across the washing chamber spaced below the top thereof, an artificial bed of comparatively large heavy pieces of material on the screen, means continuously supplying a fluid to the pulsating chamber, air and exhaust compartments near the top of the pulsating chamber, means supplying air under pressure to the air compartment, an outlet from the exhaust compartment, valve means alternately bringing the air and exhaust compartments into communication with the pulsating chamber to cause the fluid to pulsate up and down through the bed in the washing chamber, the upward movement of the fluid loosening the bed and separating the materials and the first part of the downward movement of said fluid sucking the heavier materials through the bed and the screen, a control for said outlet, and means operating the outlet control in accordance with the density or thickness of the bed in the washing chamber to control the fluid pulsations through said bed.

5. A jig separator as claimed in claim 4 in which the outlet control is operated to increase and decrease the amount of exhaust as the bed density or thickness respectively increases and decreases.

6. In a jig for separating materials of different sizes or specific gravity, comprising pulsating and washing chambers located side by side and communicating at the bottoms thereof, a screen across the washing chamber spaced below the top thereof, an artificial bed of comparatively large heavy pieces of material on the screen, means continuously supplying a fluid to the pulsating chamber, air and exhaust compartments near the top of the pulsating chamber, means supplying air under pressure to the air compartment, an outlet from the exhaust chamber, valve means alternately bringing the air and exhaust compartments into communication with the pulsating chamber to cause the fluid to pulsate up and down through the bed in the washing chamber, the upward movement of the fluid loosening the bed and separating the materials and the first part of the downward movement of said fluid sucking the heavier materials through the bed and the screen, a control valve in said exhaust outlet normally retained in a partially-open position, and means for opening and closing said valve in accordance with the density or thickness of the bed in the washing chamber to control the fluid pulsations through said bed, said valve being moved towards the open and closed positions as the density or thickness respectively increases and decreases.

7. In a jig for separating materials of different sizes or specific gravity, comprising pulsating and washing chambers located side by side and communicating at the bottoms thereof, a coarse screen across the washing chamber spaced below the top thereof, a bed of comparatively large heavy pieces of material on the screen, means continuously supplying a fluid to the pulsating chamber, air and exhaust compartments near the top of the pulsating chamber, means supplying air under pressure to the air compartment, an outlet from the exhaust chamber, valve means alternately bringing the air and exhaust compartments into communication with the pulsating chamber to cause the fluid to pulsate up and down through the bed in the washing chamber, the upward movement of the fluid loosening the bed and separating the materials and the first part of the downward movement of said fluid sucking the heavier materials through the bed and the screen, a control valve in said exhaust outlet normally retained in a partially-open position, a vertical tube having an entrance into the washing chamber below the screen, a float in the tube, and means connecting the float to the valve, said means moving the valve towards the open and closed positions as the float respectively rises and falls in the tube when the pressure in the chamber beneath the screen increases and decreases.

8. A jig separator as claimed in claim 7 in which the entrance of the tube faces laterally therefrom.

9. A jig separator as claimed in claim 7 including a gate in the tube for controlling the size of the entrance thereof.

10. A jig separator as claimed in claim 7 including means for adjusting the degree of opening and closing of the valve upon movement of the float.

11. In a jig for separating materials of different sizes or specific gravity comprising pulsating and washing chambers located side by side and communicating at the bottoms thereof, a screen across the washing chamber spaced below the top thereof, a bed of comparatively large heavy pieces of material on the screen, means continuously supplying a fluid to the pulsating chamber, air and exhaust compartments near the top of the pulsating chamber, means supplying air under pressure to the air compartment, an outlet from the exhaust chamber, valve means alternately bringing the air and exhaust compartments into communication with the pulsating chamber to cause the fluid to pulsate up and down through the bed in the washing chamber, the upward movement of the fluid loosening the bed and separating the materials and the first part of the downward movement of said fluid sucking the heavier materials through the bed and the screen, a butterfly valve controlling the exhaust outlet, said valve normally being partially open, an arm connected to the valve for rotating the latter, a vertical tube having an entrance into the washing chamber below the screen, a float in the tube, a cable connected to and extending upwardly from the float, said cable extending over a pulley and down past the valve arm, a counter-balancing weight on the free end of the cable, and stops on the cable above and below the arm for engaging the latter to move the valve towards the open and closed positions as the float respectively rises and falls in the tube when the pressure in the chamber beneath the screen increases and decreases.

12. A jig separator as claimed in claim 11 in which the stops are adjustable along the cable.

13. In a jig for separating materials of different sizes or specific gravity, comprising pulsating and washing chambers located side by side and communicating at the bottoms thereof, a coarse screen across the washing chamber spaced below the top thereof, an artificial bed of comparatively large heavy pieces of material on the screen, means continuously supplying a fluid to the pulsating chamber, air and exhaust compartments near the top of the pulsating chamber, means supplying air under pressure to the air compartment, an outlet from the exhaust chamber, valve means alternately bringing the air and exhaust compartments into communication with the pulsating chamber to cause the fluid to pulsate up and down through the bed in the washing chamber, the upward movement of the fluid loosening the bed and separating the materials and the first part of the downward movement of said fluid sucking the heavier materials through the bed and the screen, a butterfly valve controlling the exhaust outlet, said valve normally being partially open, an arm connected to the valve for rotating the latter, a float suspended above the bed, a stem extending upwardly from the float, a fluid-operated control connected to the valve, and means on the stem for operating the control to cause the valve to be moved towards the open position when the float rises and towards the closed position when the float moves in the opposite direction.

14. In a jig for separating materials of different sizes or specific gravity, comprising pulsating and washing chambers located side by side and communicating at the bottoms thereof, a screen across the washing chamber spaced below the top thereof, a bed of comparatively large heavy pieces of material on the screen, means continuously supplying a fluid to the pulsating chamber, means alternately supplying air to and exhausting air from the top of the pulsating chamber to cause the fluid to pulsate up and down through the bed in the washing chamber, the upward movement of the fluid loosening the bed and separating the materials and the first part of the downward movement of said fluid sucking the heavier material through the bed and through the screen, means controlling the exhausting of the air from the pulsating chamber in accordance with the density and thickness of the bed in the washing chamber, and a float control influenced by fluid in the washing chamber for cutting off the air supply when the pressure of the fluid beneath the bed drops below a predetermined point.

15. In a jig for separating materials of different sizes or specific gravity, comprising pulsating and washing chambers located side by side and communicating at the bottoms thereof, a screen across the washing chamber spaced below the top thereof, a bed of comparatively large heavy pieces of material on the screen, means continuously supplying a fluid to the pulsating chamber, means alternately supplying air to and exhausting air from the top of the pulsating chamber to cause the fluid to pulsate up and down through the bed in the washing chamber, the upward movement of the fluid loosening the bed and separating the materials and the first part of the downward movement of said fluid sucking the heavier material through the bed and through the screen, means controlling the exhausting of the air from the pulsating chamber in accordance with the density and thickness of the bed in the washing chamber, a vertical tube opening at its lower end into the washing chamber beneath the bed therein, a float in the tube, and means operated by the float when the pressure beneath the bed drops below a predetermined point to shut off the air supply.

References Cited in the file of this patent

UNITED STATES PATENTS

| | | |
|---|---|---|
| 1,853,763 | Demonceaux | Apr. 12, 1932 |
| 2,035,750 | Hirst | Mar. 31, 1936 |

FOREIGN PATENTS

| | | |
|---|---|---|
| 619,475 | Great Britain | Mar. 9, 1949 |
| 851,481 | Germany | Oct. 6, 1952 |
| 931,450 | France | Oct. 20, 1947 |